United States Patent
Köhler et al.

[11] Patent Number: 5,957,555
[45] Date of Patent: Sep. 28, 1999

[54] SWITCHGEAR CABINET WITH A RAIN DEFLECTION DEVICE

[75] Inventors: Martina Köhler, Herborn; Wolfgang Reuter, Burbach, both of Germany

[73] Assignee: Rittal-Werk Rudolf Loh GmbH & Co. KG, Herborn, Germany

[21] Appl. No.: 08/887,784

[22] Filed: Jul. 3, 1997

[30] Foreign Application Priority Data

Jul. 6, 1996 [DE] Germany ............... 196 27 281

[51] Int. Cl.⁶ .................................... A47B 81/00
[52] U.S. Cl. ............ 312/100; 312/257.1; 312/296; 211/26
[58] Field of Search ............ 312/257.1, 265.1, 312/265.2, 265.3, 265.4, 265.5, 265.6, 263, 140, 100, 329, 296; 211/26, 184, 189, 191; 361/724, 725; 52/653.1, 653.2; 49/484.1; 174/52.1

[56] References Cited

U.S. PATENT DOCUMENTS

| | | | |
|---|---|---|---|
| 2,899,254 | 8/1959 | Latzko | 312/296 X |
| 3,370,521 | 2/1968 | Honerkamp | 312/257.1 X |
| 4,665,654 | 5/1987 | Stedron et al. | 49/484 |
| 5,232,277 | 8/1993 | Cassady et al. | 312/296 |
| 5,801,331 | 9/1998 | Zachrai | 312/100 X |

FOREIGN PATENT DOCUMENTS

| | | | |
|---|---|---|---|
| 3013433 | 10/1980 | Germany | 312/257.1 |
| 3440899 | 4/1986 | Germany . | |
| 645808 | 11/1950 | United Kingdom | 312/257.1 |

*Primary Examiner*—Peter M. Cuomo
*Assistant Examiner*—James O. Hansen
*Attorney, Agent, or Firm*—Pauley Peterson Kinne & Fejer

[57] ABSTRACT

A switchgear cabinet with a cabinet door and/or wall elements and a cover element covering the top, wherein a rain deflection device is disposed in the transition area between the upper horizontal edge of the cabinet door and/or the wall elements and the cover element. The removal of the collecting rainwater is possible with little structural effort in that in the transition area between the cabinet door and/or the wall elements and the cover element, a run-off channel is formed on the cover element or the cabinet door (wall element), and the cover element and/or the cabinet door (wall element) have guide devices, which guide the collecting water into the run-off channel.

2 Claims, 4 Drawing Sheets

SWITCHGEAR CABINET WITH A RAIN DEFLECTION DEVICE

BACKGROUND OF THE INVENTION

1. Field of the Invention

This invention relates to a switchgear cabinet with a cabinet door, wall elements, and a cover element covering the top comprising a rain deflection device disposed in the transition area between the upper horizontal edge of the cabinet door and/or the wall elements and the cover element.

2. Description of Prior Art

In order to protect the electrical installations contained in the interior of a switchgear cabinet, a switchgear cabinet is closed off toward the exterior in a moisture-proof manner. To this end, the cabinet door, which permits access to the interior, is provided with a circumferential seal. It can occur, however, that water collects, in particular, on the upper horizontal seal. If the cabinet door is now opened, the water runs off and can drip into the interior of the switchgear cabinet. German Patent Publication DE 34 40 899 C1 teaches a rain deflection device for a switchgear cabinet to prevent this occurrence.

In switchgear cabinets of this type, a specially equipped receptacle is provided on the cover element of the switchgear cabinet. A strip can be inserted into this receptacle, which extends over the entire length of the upper horizontal edge of the cabinet door. A lip of the strip rests on the upper edge. This prevents water from collecting on the seal.

SUMMARY OF THE INVENTION

It is an object of this invention to reduce the structural complexity in connection with a switchgear cabinet of the type mentioned at the outset.

These and other objects of this invention are attained by a switchgear cabinet having a run-off channel with a transition area formed on the cover element or the cabinet door and/or the wall elements, where the cover element and/or the cabinet door and/or the wall elements have guide devices which guide the collecting water into the run-off channel.

The water which penetrates between the cabinet door and the cover element or along the wall elements is collected in the run-off channel. Because the run-off channel is formed on the cover element or the cabinet door or the wall elements, only a small structural effort is required. The cover element or the cabinet door can be made of sheet metal, for example. In that case, the run-off channel is preferably beveled. The water is fed into the run-off channel by way of the guide devices. In this way, it is assured that the collecting water cannot penetrate past the run-off channel.

In accordance with one embodiment of this invention, a circumferential seal with horizontal and vertical sealing elements seals the cabinet door or the wall elements against the interior of the switchgear cabinet, the run-off channel is arranged above the upper horizontal sealing element, and the run-off channel extends at least over the entire length of the upper sealing element and has a drain at least at one end.

An absolute seal against moisture is assured by this sealing element. Because the run-off channel is disposed above the upper horizontal sealing element, it is assured that water can not collect on the sealing element. The water caught in the run-off channel is removed by means of a drain in such a way that it cannot reach the interior of the switchgear cabinet.

If, for example, the run-off channel has been placed at an angle, it may be sufficient to provide a drain only on the end of the run-off channel which is low. With a horizontally extended run-off channel, drains can be provided on both sides.

A preferred embodiment of the switchgear cabinet of this invention comprises a circumferential seal fixed in place on the cabinet door or the wall elements and resting against sealing strips of frame legs of a cabinet frame of the switchgear cabinet. In this case, the seal is foamed, for example, on the inside of the cabinet door and/or wall elements.

A switchgear cabinet in accordance with one embodiment of this invention comprises the cabinet door and/or wall elements made of sheet metal folded inward by 180° on its upper horizontal edge, whereby adjoining the fold formed in this way is a bevel which is bent upward, constituting the run-off channel.

In this case, the entire cabinet door can be produced from a stamped sheet metal blank. Because the upper edge is folded over by 180°, a round end is produced, which does not have to be further finished. The run-off channel, formed in one piece on it, furthermore is used as a stiffening element for the cabinet door.

In accordance with a particularly preferred embodiment, the cabinet door and/or wall element is provided with angled bars on both its vertical sides, and the bars contact the front edges of the bevel connected to the fold and are connected therewith. The connection can be made by material contact, for example by means of a weld.

A structurally simple embodiment variant of a switchgear cabinet in accordance with this invention provides for the drainage of the water collected in the run-off channel whereby the bevel connected to the fold of the cabinet door is provided in its end areas with a jog, which constitutes the drain for the collecting water.

In accordance with another embodiment of this invention, the bars of the cabinet door are provided with cutouts which are in communication with to the run-off channel. As a result, the water collected in the run-off channel flows off through the drain on the outside of the bar.

In accordance with one embodiment of this invention, the cabinet door made of sheet metal is folded inward by 180° on its upper horizontal edge and two vertical edges, a bevel is provided adjoining the folds formed in this way, and the bevels of the vertical edges are connected to the ends of the run-off channel. The run-off channel then makes a transition into a vertical downspout. The water then can flow downward in this downspout.

By employing the bevels, the cabinet door is uniformly stiffened. It is also possible to provide a right-left opening of the door, where a bevel and a fold are provided in the same way on the lower horizontal edge of the cabinet door. The wall elements can either have the bevel and the fold at the top and the bottom or only at the top.

In accordance with a further embodiment, the cover element comprises a downward directed angled piece at the front on its edge facing the cabinet door, which makes a transition into an upward directed bevel for forming the run-off channel.

In order to guide the water in a directed manner to the run-off channel, a switchgear cabinet in accordance with this invention comprises a fold or an angled piece bent inward from the cabinet door and an angled piece provided at the front of the cover element which form guide elements for the run-off channel.

In accordance with all of the above described embodiments, a symmetrical embodiment of the cabinet door is preferred for realizing the right-left opening of the cabinet door. To this end, a run-off channel is connected to both the upper and the lower horizontal edge of the cabinet door.

BRIEF DESCRIPTION OF THE DRAWINGS

These and other objects and features of this invention will be better understood from the following detailed description taken in conjunction with the drawings wherein.

DETAILED DESCRIPTION OF PREFERRED EMBODIMENTS

Figure 1:
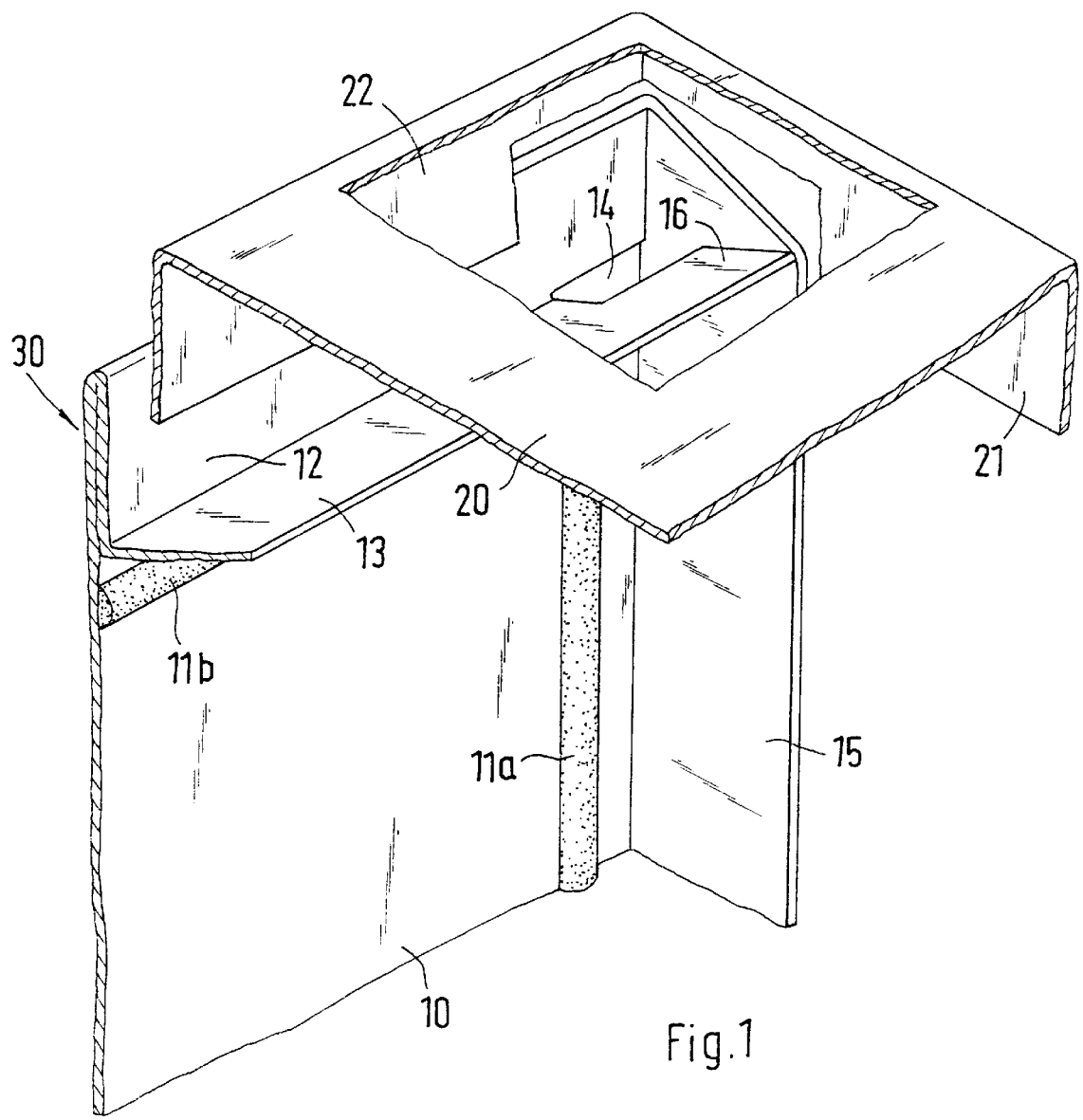
FIG. 1 is a perspective partial cross-sectional view of a cover element and a cabinet door with a run-off channel of a switchgear cabinet in accordance with one embodiment of this invention.

A cover element 20 and a cabinet door 10 of a switchgear cabinet, not shown in detail, are shown in FIG. 1. The cover element 20 and the cabinet door 10 are only partially shown.

On both its vertical edges, the cabinet door 10 is provided with bars 15 which are angled away from the front of the cabinet. The upper horizontal edge of the cabinet door 10 is bent over by 180°, so that the fold 12 is created. A bevel 13 has been provided adjoining the fold 12. The bevel 13 is directed obliquely upward. Together with the fold 12, bevel 13 forms an angle which is less than 90°. A run-off channel 30 is thus formed by the bevel 13 disposed at an angle to the fold 12 in this way. A horizontal sealing element 11b of a circumferential seal is disposed beneath run-off channel 30. The circumferential seal further comprises vertical sealing elements 11a and a lower sealing element, not shown in detail. This seal is formed on the inside of the cabinet door 10. The seal cooperates with sealing bars, which are arranged on frame legs of a cabinet frame. The cabinet frame constitutes the support frame to which the cover element 20 and the lateral walls are connected. The cover element 20 is formed of a sheet metal blank, which is beveled all around, so that front and lateral angled sections 22, 21 are formed.

A section has been removed from the cover element in FIG. 1 for improved clarity. As can be seen through this removed section, a cutout is formed by the bevel 13 of the run-off channel 30 in the transition area to the fold 12. This cutout is used as a drain 14 for water collected in the run-off channel. In accordance with this embodiment, drain 14 is disposed in the area between the bar 15 and the vertical sealing element 11a, so that the water can run off on the outer side of the sealing element 11a. Water is thus prevented from penetrating into the interior of the switchgear cabinet.

The bevel 13 is fitted to the bar 15 on its front. A connection of material to material, for example a weld, is provided at this connecting point 16. The cabinet door 10 is additionally stiffened by this. As can be seen in the representation in FIG. 1, the front angle piece 22 of the cover element 20 and the fold 12 form guide devices. The collected water is thus guided in an aimed and directed manner into the run-off channel 30. The guide devices therefore prevent water from penetrating the cabinet door in an uncontrolled manner.

Figure 2:
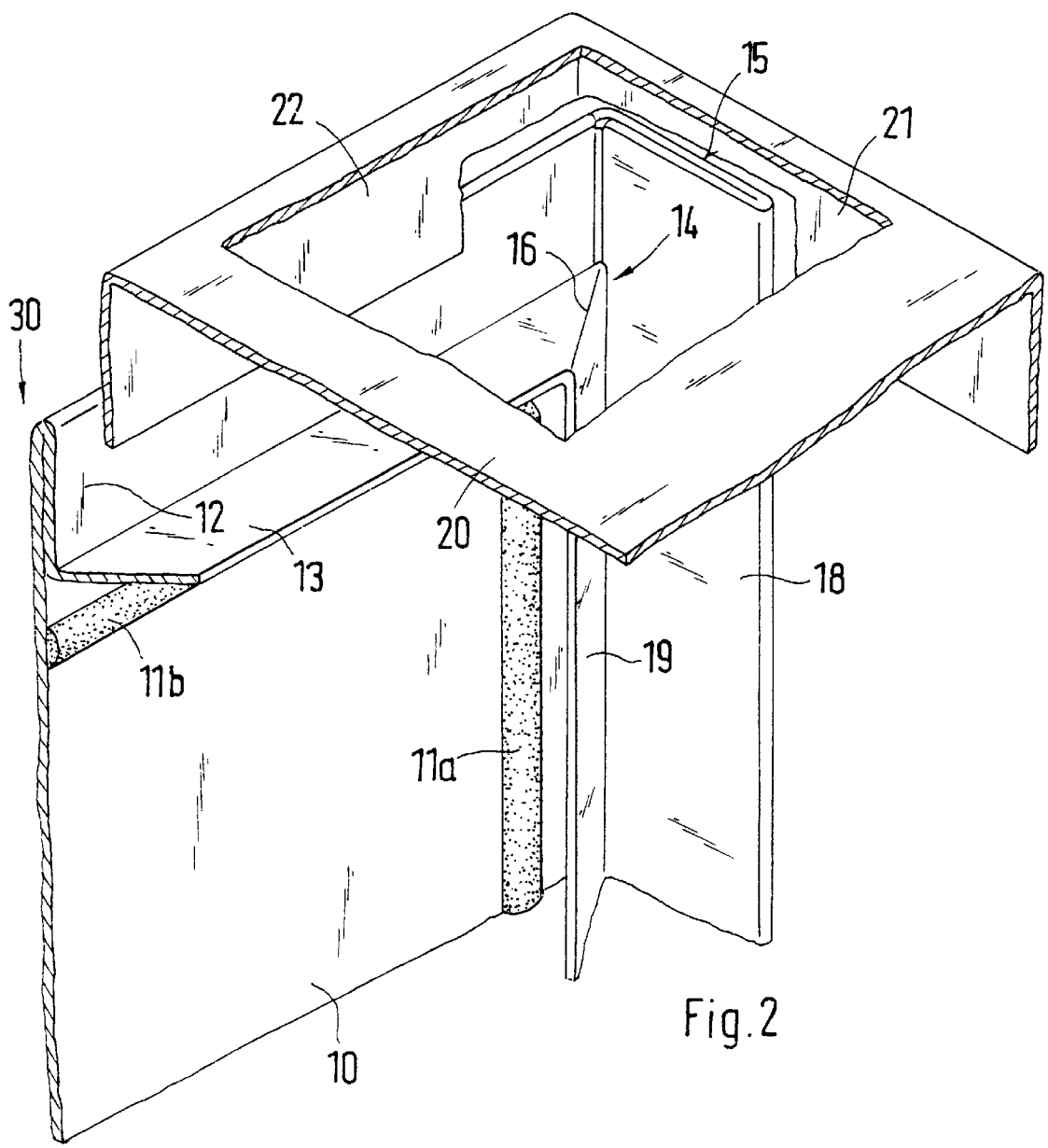
FIG. 2 is a perspective partial cross-sectional view of a cover element and a cabinet door with a run-off channel of a switchgear cabinet in accordance with another embodiment of this invention.

An embodiment of this invention is shown in FIG. 2, which is similar to that in FIG. 1. However, in contrast to FIG. 1, the bevel 13 does not have cutouts constituting a drain 14. To form such a drain, the front of the bevel 13 is slanted. At the same time a fold 18 is bent inward from the bar 15. The folded bar 15 makes a transition into an inwardly directed bevel 19. This bevel is also slanted on its front. The slanted fronts of the bevels 13 and 19 are connected to each other at the connecting point 16, for example by welds. In this way, the run-off channel 30 makes a transition into a downspout, in which the water is conveyed away downward. The bevel 19 is also disposed in the area between the vertical sealing element 11a and the bar 15.

This design provides that the bar 15 is additionally stiffened by the fold 18. A high torsional stiffness of the cabinet door is achieved by means of the connection of the two bevels 13 and 19.

Figure 3:
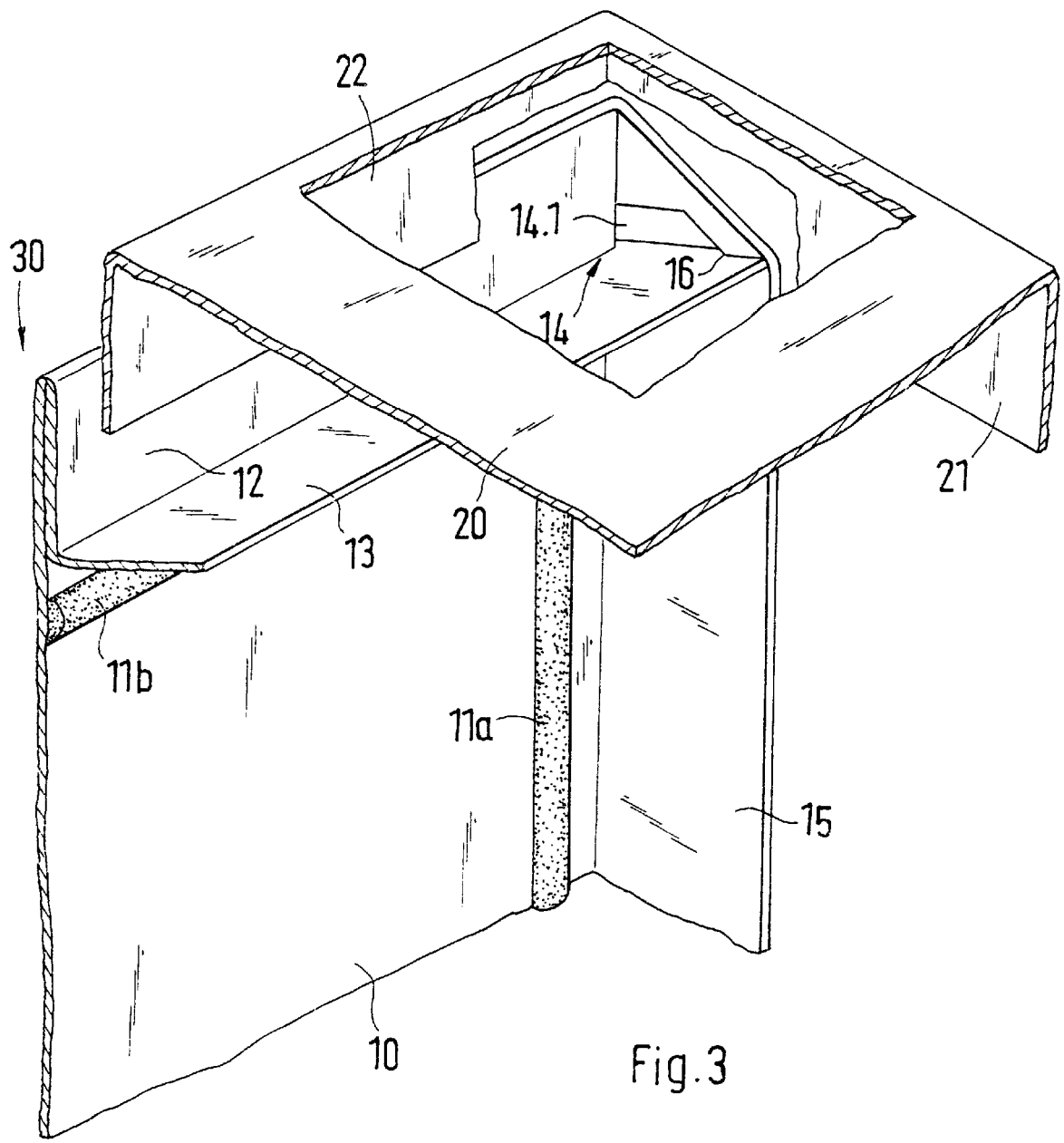
FIG. 3 is a perspective partial cross-sectional view of a cover element and a cabinet door with a run-off channel of a switchgear cabinet in accordance with another embodiment of this invention.

In accordance with the embodiment shown in FIG. 3, a cutout 14.1 is provided in the vertical bar 15 for forming the drain 14. In this case, the collected water then flows off along the outside of the bar 15.

It is preferred in all of the embodiments in accordance with FIGS. 1 to 3, that the cabinet door 10 be symmetrically designed. In this case, a run-off channel 30 is disposed on both the upper and the lower horizontal edge of the cabinet door 10. The user of the switchgear cabinet can then freely decide whether to provide a right or a left opening of the cabinet door 10.

Figure 4:
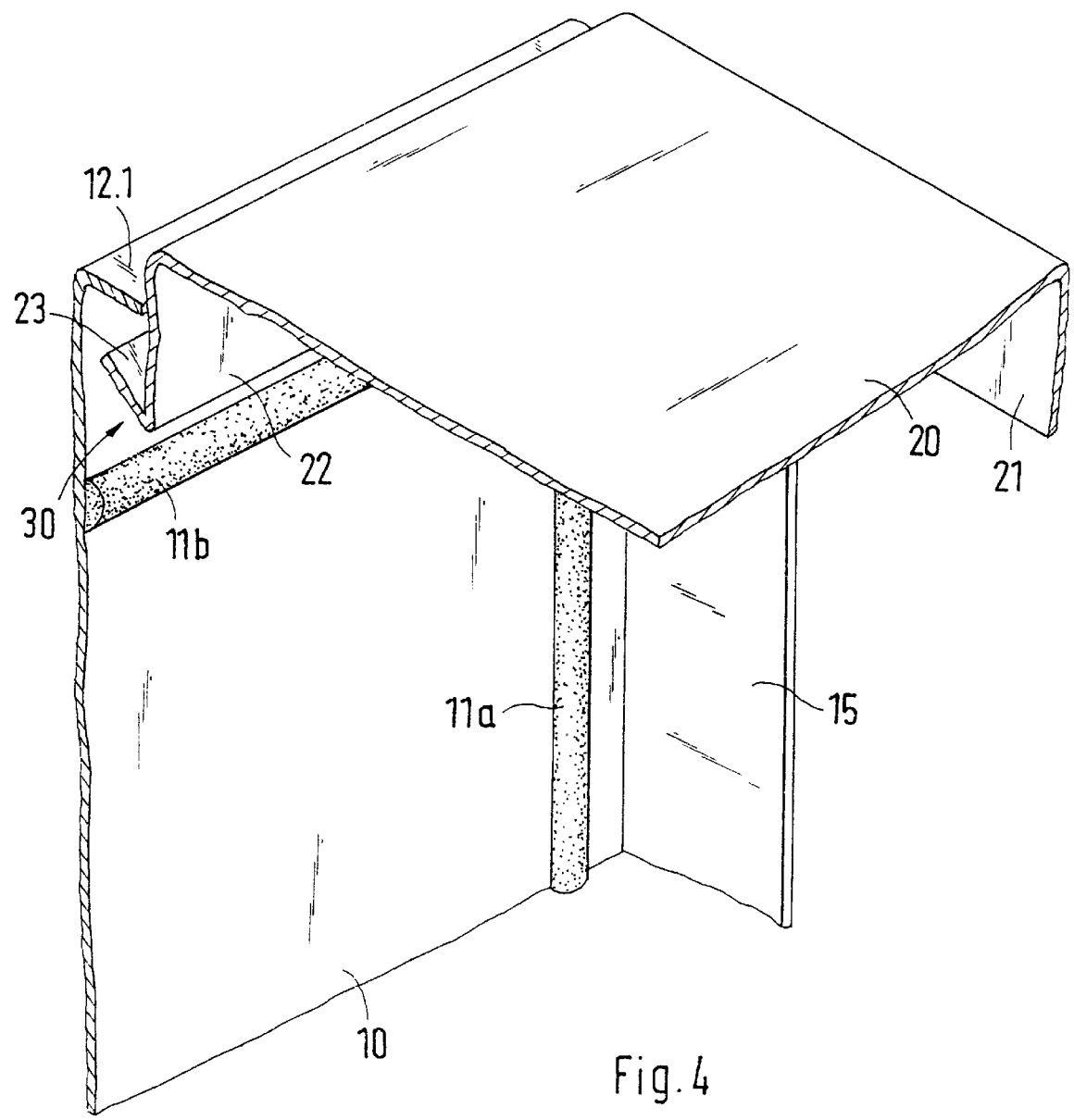
FIG. 4 is a perspective partial cross-sectional view of a cabinet door and a cover element with a run-off channel.

FIG. 4 shows a cabinet door 10 of a switchgear cabinet having a backward oriented angle piece 12.1 on its upper horizontal edge. The cover element 20 constitutes the run-off channel 30. To this end, an upward directed bevel 23 is connected to the front side angle piece 22 of cover element 20. In this case, the bevel 23 and the angle piece 12.1 constitute guide devices for the run-off channel 30. The water collected in the run-off channel 30 again can be guided away in different ways. It is always important in connection with the drain that the water be removed on the outer side of the vertical sealing element 11a in order to prevent the penetration into the interior of the switchgear cabinet.

What is claimed is:

1. In a switchgear cabinet comprising a cabinet door, a plurality of wall elements and a cover element covering a top of said switchgear cabinet, and a rain deflection device disposed in a transition area between an upper horizontal edge of at least one of the cabinet door and one of said wall elements and the cover element, the improvement comprising:

one of the cover element (20) and at least one of the cabinet door (10) and the wall element forming a run-off channel (30) in said transition area and comprising at least one guide device (12, 22), said at least one guide device suitable for guiding collecting water into the run-off channel (30);

a circumferential seal comprising at least one horizontal sealing element (11b) and a plurality of vertical sealing elements (11a) sealing one of the cabinet door (10) and the wall element against an interior of the switchgear cabinet, the run-off channel (30) disposed above said horizontal sealing element (11b), and the run-off channel (30) extending at least over an entire length of the horizontal sealing element (11b) and forming a drain

(14) at least at one end, said circumferential seal being fixed in place on the cabinet door (10) or the wall element; and said cabinet door (10) being made of sheet metal and at least one of said cabinet door (10) and the wall element being folded inward by 180° on an upper horizontal edge, forming a fold (12) constituting said guide device and a bevel (13) bent upward adjoining the fold (12), thereby forming the run-off channel 30.

2. A switchgear cabinet in accordance with claim 1, wherein said at least one of the cabinet door and the wall element comprises an angled bar (15) on both vertical sides, and each said angled bar (15) contacts a front edge of the bevel (13) adjoining the fold (12) and is connected to said bevel (13).

* * * * *